United States Patent [19]

Wolf et al.

[11] Patent Number: 5,297,442
[45] Date of Patent: Mar. 29, 1994

[54] METHOD TO DETERMINE LIQUID FLOW RATE FOR MANIFOLD FEED NOZZLES

[75] Inventors: Henry A. Wolf, Franklin Lakes; Richard J. Bellows, Hampton, both of N.J.

[73] Assignee: Exxon Research & Engineering Company, Florham Park, N.J.

[21] Appl. No.: 63,831

[22] Filed: May 20, 1993

Related U.S. Application Data

[63] Continuation of Ser. No. 718,506, Jun. 20, 1991, abandoned.

[51] Int. Cl.⁵ ............................................... G01F 1/00
[52] U.S. Cl. ..................................... 73/861; 73/168
[58] Field of Search ................. 73/861.18, 861, 865.9, 73/168, 3; 239/1, 74

[56] References Cited

U.S. PATENT DOCUMENTS

3,245,254  4/1966  Mayer.
4,357,670  11/1982  McFarlane.
5,049,317  9/1991  Kiske et al.

Primary Examiner—Herbert Goldstein
Assistant Examiner—R. Biegel
Attorney, Agent, or Firm—Ronald D. Hantman

[57] ABSTRACT

The present invention is a method for determining the mass flow rate of liquid from each of the nozzles on a manifold of nozzles. A method is demonstrated to provide an absolute calibration technique.

16 Claims, 13 Drawing Sheets

METHOD TO DETERMINE LIQUID FLOW RATE FOR MANIFOLD FEED NOZZLES

This is a continuation of U.S. application Ser. No. 718,506, filed Jun. 20, 1991 now abandoned.

BACKGROUND OF THE INVENTION

The present invention describes an absolute calibration method for measuring the liquid mass flow rate to a two phase (gas/liquid) feed nozzle in a manifolded system. In some embodiments, the method does not require direct mechanical contact between the sensor and liquid material.

Two phase nozzles are important for a variety of applications particularly for the injection of atomized feed in chemical or petroleum processing operations. In many such processes, operability or selectivity improvements result when an atomized hydrocarbon liquid is sprayed in a controlled and measured manner into the reaction zone, particularly when a process catalyst is involved. One example is the process of fluidized catalytic cracking (FCC) of higher boiling petroleum fractions. Typically, a high degree of feed atomization is achieved by mixing the liquid feed with a gas and injecting the mixture into the process from a feed nozzle designed to produce finely dispersed drops. In catalytic cracking, steam is typically used as the atomizing gas, but any process compatible gas may be used.

The need to control and measure the distribution of the atomized liquid sprayed into a process vessel is normally satisfied by using multiple services or nozzles. Maintaining the proper mixture of liquid to steam for atomization, and ensuring that each nozzle carries a specified liquid or mass flow, enables potential unit operating advantages. One common operating mode is to maintain equal liquid flow in each nozzle. Most installations which have multiple feed nozzles usually include block valves or restriction orifices on the liquid and gas lines; but these do not uniquely determine the liquid flow. When nozzles are fed from a common manifold, there is no assurance that the liquid flow through each nozzle is optimized since only the net liquid flow to the total manifold can be readily measured. In fact, measurement of various manifolded nozzle flows has usually shown significant deviations from equal liquid flows to each nozzle. In contrast, the gas flow to a nozzle is usually determined by a restriction orifice on the gas line which ensures relatively uniform gas distribution to the individual nozzles.

Measuring mass flow of a liquid is not new. There are a variety of flow meters that have been used to measure mass flow. Some of them are mechanical in nature utilizing the force of a moving liquid to turn a wheel or deflect a needle. Such flow meters can only measure mass flow in single phase conditions and are usually restricted to non-fouling liquids. Flow meters available for the single phase flows common to the petroleum and petrochemical industry tend to be quite costly. The very high temperatures that are maintained to reduce flow viscosity impose yet other complications. Furthermore, the service liquids readily foul and clog the mechanical components of such flow meters.

There are a variety of flow meters known as "vortex flow meters" that utilize vortex wakes proceeding from obstacles placed in the flow to measure the velocity of the flow from the frequency of vortex shedding. Such flow meters are again limited to single phase flow. Again, they require placement of an obstacle in the flow, and hence are again prone to fouling. The temperature range of most systems is narrow due to fundamental restrictions on the sonic transducers required to pick up the sound generated by the obstacle.

There are a variety of acoustic flow meters that utilize ultrasonics to measure flow. A class of such flow meters utilizes an ultrasonic transducer/receiver attached to the pipe containing the moving fluid, and an ultrasonic receiver/transducer attached to the same pipe up stream and/or down stream of each other. The high operating temperatures of many petroleum and petrochemical processes, as well as geometrical constraints on the attachment of the acoustic devices, make these flow meters difficult and expensive to apply in many petroleum and petrochemical applications. The temperatures often exceed the operating limits of many single phase flow meters.

Measurement of the liquid fraction of a gas/liquid mixture flowing through two phase nozzles is difficult. Usual devices for flow measurement are sensitive only to the velocity of the flow or its pressure and not to mass flow. Hence, such devices are incapable of measuring liquid flow without separate and equally complex measurements of the density of the mixture. Devices that are capable of measuring single phase liquid flow are expensive and are often intrusive since they require the insertion of an orifice or barrier in the flow which can be easily fouled by the liquid portion of the mixture. Since in most petroleum and petrochemical applications, the two phase mixture is maintained at an elevated temperature to achieve a sufficiently low viscosity for flow, there is a temperature limitation on flow measurement devices as well.

Thus most petroleum and petrochemical installations do not meter flows to each feed nozzle because suitable flow meters are expensive due to the severity of process conditions. The development of specialized flow meters to meet such stringent conditions would require significant expense and undesired complexity.

Although petroleum and petrochemical processing units may demonstrate improved operation with specified liquid distribution from manifolded feed nozzles, only the net liquid flow to the manifold is usually measured or controlled. However, without a measuring scheme, the probability of a desired flow distribution among feed nozzles is small due to the complex nature of the two phase the fluid exiting the nozzle. Uncertainties in liquid distribution are compounded by the possibility that a portion of the liquid feed could be vaporized. The existence of such flow imbalance is usually inferred only by anomalous process conditions or changes in process output yields over an extended period of time. Furthermore, feed nozzles can partially plug or erode leading to significant flow maldistributions which can remain undetermined until the unit is shut down for maintenance. There is thus a need for a technique that can measure and monitor the liquid flow from an individual nozzle.

SUMMARY OF INVENTION

The present invention is a method to determine the mass flow rate through each nozzle in the manifold nozzles. The invention describes an absolute calibration method for measuring the liquid mass flow rate to individual nozzles in a manifolded two phase (gas/liquid) feed nozzle system. The present invention can also be expressed as a method for measuring volume of liquid flow because mass and volume are related by a nearly consistent density for a given liquid. For convenience, the "mass flow" shall be used to denote both. Virtually any gas/liquid service combination can be accommodated. The method requires measuring (1) the net liquid flow to the manifold; and (2) a quantity that responds in a consistent fashion to liquid flow (i.e., the quantity is functionally monotonically related to the volumetric flow rate of liquid flow). This quantity is called the "liquid flow parameter", $P_{ij}$, for the ith nozzle under manifold condition j. For manifolded systems, where pressures and temperatures are specified for each nozzle, the liquid mass flow can be uniquely determined from volumetric flow. This invention shows how liquid mass flow rate can be determined easily using simple to maintain transducers that are in common use. Examples of liquid flow parameters include: pressure (static or dynamic); the liquid flow peak in a frequency spectrum; the gas peak in a frequency spectrum. The liquid flow peak and gas peak can be readily measured with an accelerometer vibration sensor. The invention technique does not require direct mechanical contact between the sensor and liquid material. Moreover, the technique can be applied in an on-line electronic mode or manually. Any transducer that provides a functionally consistent monotonic indication with respect to the volume of the flow can be used for measuring $P_{ij}$. Examples of such transducers include:

(1) a pressure transducer (static or dynamic) in contact with the gas downstream of the restriction orifice (RO) controlling the gas contribution to the individual nozzle's two phase (gas/liquid) flow;

(2) an accelerometer or other vibrational sensor in contact with the solid borne sound generated by the restriction orifice (RO) controlling the gas or in contact with the liquid flow turbulence within the nozzle;

(3) other transducers with functionally consistent indications of the volume of liquid flow.

The liquid flow parameter measured by a dynamic pressure transducer or accelerometer is defined for a signal integrated over a specific frequency band. That frequency band is determined experimentally such that the integrated response is monotonically related to liquid flow rate. The experimental determination is accomplished by incrementing the liquid flow rate in discrete steps while measuring the liquid flow parameter. Frequency bands for the liquid flow parameters in petroleum and petrochemical applications have been observed as: 0–6400 Hz (acceleration liquid flow peak); 4000–12,000 Hz (acceleration gas peak); 0–1000 Hz (dynamic pressure). The liquid flow peak is monotonically increasing for increasing liquid flow; the gas peak is monotonically decreasing for liquid flow; dynamic pressure is monotonically increasing for increasing liquid flow. For these particular examples, the monotonic relationship is approximately linear for FCC feed manifolds.

The invention specifically includes a measuring procedure which generates a system of equations that define the absolute per nozzle flow rate as a function of the liquid flow parameter. A method is included to uniquely specify all of the unknown constants (calibration coefficients) in the equations. Finally, the procedure taught may be applied while said nozzles are fully commissioned (in service) with the process gas/liquid.

From the general method taught by this invention, absolute liquid flow rates can be measured and monitored in real time for a wide degree of liquid/gas atomization conditions in individual feed services or nozzles using a variety of transducers. Since the method measures quantities related to the mass of the flowing fluid, it is a widely applicable technique for many categories of two-phase fluid sprayers. Since the output of the method taught is electronic in nature, it is easily transmitted to a control system and can be used to automatically measure and control the feed atomization and feed flow through individual nozzles fed off a common manifold.

BRIEF DESCRIPTION OF THE DRAWINGS

FIGS. 3a, 2b, 3a and 3d show a suite of rms acceleration spectra illustrating the linearly dependent RO accelerating gas peaks with respect to liquid flow.

DESCRIPTION OF THE PREFERRED EMBODIMENT

The present invention describes an absolute, in-service calibration method for measuring the liquid mass flow rate to individual nozzles in a manifolded two phase (gas/liquid) feed nozzle system. The method requires measuring: (1) the net liquid flow to the manifold; and (2) a quantity that responds in a functionally consistent monotonic fashion (the liquid flow parameter, $P_{ij}$ for nozzle i under manifold condition (j) with respect to liquid flow. Examples of approximately linearly responding parameters include: pressure (static or dynamic); the liquid flow peak; the gas peak. The liquid flow peak and gas peak are measured with an accelerometer. The invention does not necessarily require direct mechanical contact between the transducer and the liquid. Furthermore, the calibration procedure taught in this invention may be performed with the manifold fully operational. Therefore, results will be sensitive to changes which have occurred after unit start-up.

The net liquid flow to the manifold is typically measured in most present applications. The typical metering device uses a metering orifice in the liquid line upstream or downstream of the preheat furnace.

The liquid flow parameter, $P_{ij}$, can be measured by any transducer that responds in a functionally consistent fashion with respect to liquid flow. A practical and an advantageous feature is that absolute calibration of the transducers is not required. More remarkably, it is not even required that the liquid flow parameter measure the same physical quantity for each of the nozzles. For example, one nozzle can be monitored by a static pressure transducer and another by RO acceleration gas peaks. It is only required that each transducer provide a repeatable indication with respect to liquid flow.

Figure 1A:
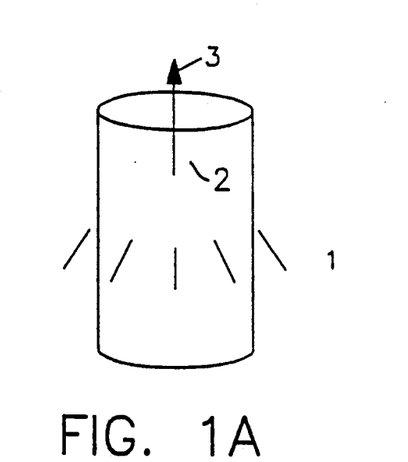
FIG. 1a shows a schematic of the feed injection zone on a fluidized catalytic cracking unit indicating the placement of the feed nozzles.
Figure 1B:
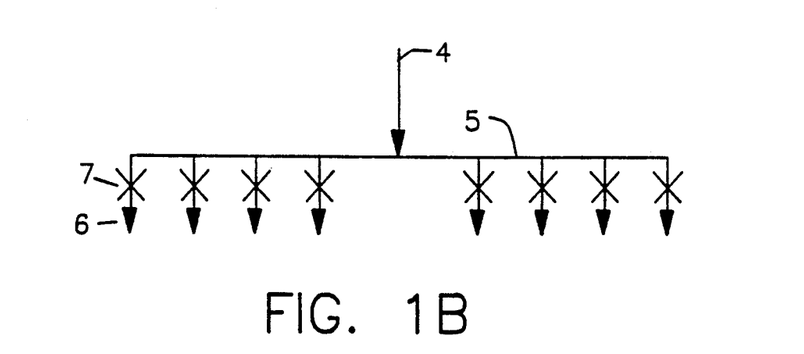
FIG. 1b shows the oil header supplying oil to the manifold and to individual feed nozzles with oil block valves indicated.
Figure 1C:
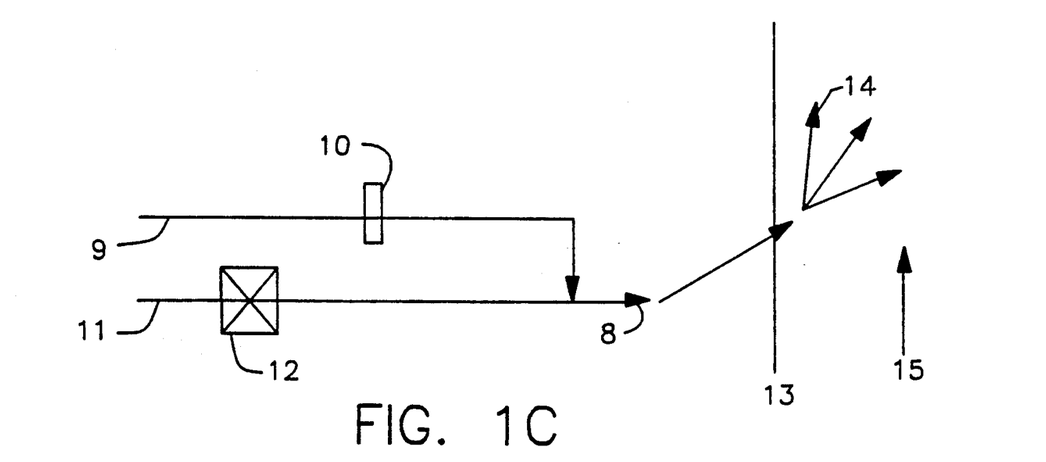
FIG. 1c shows the flow connections to an individual feed nozzle where the steam flow is determined through a restriction orifice (RO) and where the oil flow can be controlled by a block valve.

Moreover, the technique can be applied in an electronic, on-line mode or manually. In the electronic mode, the calibration parameters can be calculated and stored algorithmically. The stored parameters can then be used to provide an on-line measure of liquid flow rate. If desired, this measure of liquid flow is readily available as a signal to a control algorithm to effect intentional changes to the manifold distribution FIG. 1a is a schematic of the injection region of a typical FCC unit showing the location of eight (for this example) feed nozzles (1) injecting into feed riser (2) with catalyst flow (3) indicated. Oil to the feed nozzles is distributed from header (4) to a common manifold (5) as shown in FIG. 1b. As indicated in the figure, individual block valves (7) in each line control the oil flow to the nozzle (6). As shown in FIG. 1c, steam (9) and oil (11) are fed to an individual nozzle (8): where the steam serves the dual purpose of atomizing the oil and keeping the nozzle unplugged when the oil is off. Oil flow is controlled by the block valves (12) as indicated in FIG. 1c; steam flow is controlled by having the high pressure steam flow through a restriction orifice (RO) (10) which typically under conditions of "choke flow" maintains a constant mass flow of steam independent of its downstream pressure. The pressure upstream of the RO typically remains constant. The nozzle protrudes into the feed riser wall (13) to disperse atomized oil (14), onto flow catalyst (15).

Figure 1D:
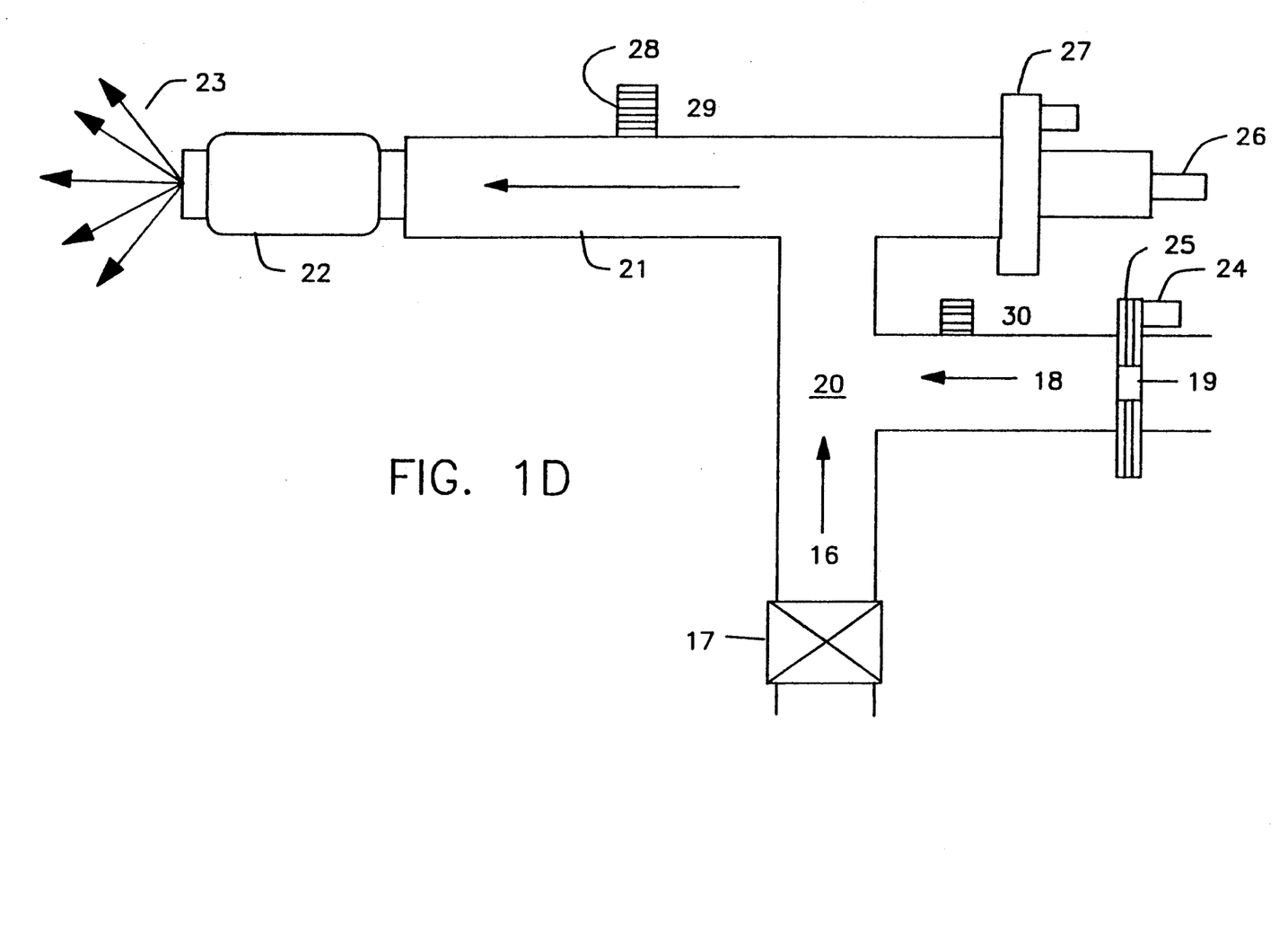
FIG. 1d shows suitable locations for the dynamic pressure transducer which should be in acoustic contact with the gas/liquid downstream of the gas/liquid mixing point; the static pressure transducers should be in contact with gas; and the accelerometer which should be mounted such that it is sensitive to the solid borne sound emitted by the flow through the RO. The accelerometer may be located on the face or edge of the flange in which the RO is held, or in any convenient point on the feed nozzle such as the rodding plug or nozzle flange. Alternatively, the accelerometer can be mounted so that it is sensitive to the liquid flow noise (such as on the rodding plug).

FIG. 1d shows an individual feed nozzle plumbing in more detail. Oil (16) flowing through block valve (17) mixes with steam (18) controlled by RO (19). The oil/steam mix point (20) is located downstream of both the oil valve and RO. The mixture is pushed through nozzle barrel (21) to the nozzle tip (22) and exits as a spray (23) from the nozzle tip.

In one embodiment of the invention, a vibrational sensor (24) is placed on or adjacent to the flange (25) supporting RO (19) or in any location in direct contact with the RO-generated sound and vibration (e.g., the gas peak); or positioned to be responsive to liquid flow-generated sound and vibration such as on the rodding plug (26) or rodding plug flange (27) (e.g., the liquid flow peak). Any location where the accelerometer is sensitive to the changes in the flow noise generated by the RO or liquid/gas mixing is acceptable. In another embodiment of the invention, a static or dynamic pressure transducer (28) is located to be in contact with the flow downstream of the RO or the oil/steam mix point. Any location where the transducer is sensitive to changes in the flow rate is acceptable. Workable examples include location (29) for the dynamic pressure gauge or location (30) for the static pressure gauge.

As noted, this invention describes an absolute, in-service calibration method for measuring the per nozzle liquid flow in a two phase manifolded nozzle system where the gas flow is controlled by a restriction orifice. The nozzles used for injecting oil into fluidized catalytic cracking units are of particular importance and will be used for examples in this invention. For these nozzles, the gas is steam and the liquid is oil. To formulate the necessary calibration equations, it is necessary to conduct measurements on the liquid feed system in a multitude of distinct operating conditions, each denoted by subscript j in the following description.

The generalized functional relationship between the liquid flow parameter and the per nozzle liquid flow rate may be expressed as follows:

$$F_{ij} = f_i(P_{ij}) \qquad (1)$$

where:
$F_{ij}$ = liquid flow rate for nozzle i under manifold condition j.
$f_i(P_{ij})$ = liquid flow rate for nozzle i expressed as a function, $f_i$, of the liquid flow parameter, $P_{ij}$, under manifold condition j. The functional relationship, $f_i$, is assumed invariant to manifold conditions Note: all of the double subscript notation follows the convention that the first subscrip denotes a specific nozzle, and the second subscript identifies a specific manifold condition.

It has been discovered that $f_i$ may often reduce to a low order polynominal:

$$F_{ij} = A_i + B_i P_{ij} + C_i P_{ij}^2 + \ldots + \qquad (2)$$

where:
$A_i$, $B_i$, $C_i$, . . . are the calibration coefficients that define the polynomial relationship correlating flow parameter $OP_{ij}$ with liquid flow rate from nozzle i under manifold condition j. The calibration coefficients are assumed invariant to manifold conditions j for fixed manifold geometry.

For the important case of FCC unit feed

For the important case of FCC unit feed nozzles, the low order polynomial of Equation (2) often reduces to the linear case:

$$F_{ij} = A_i + B_i P_{ij} \qquad (3)$$

where $A_i$ is interpreted as the flow axis intercept and where $B_i$ is interpreted as the linear slope.

The total manifold liquid flow, $M_j$, is specified for condition j and is computed from Equation (1) by summing the N individual liquid-commissioned nozzle flows, $F_{ij}$:

$$M_j = \sum_{i=1}^{N} F_{ij} = \sum_{i=1}^{N} F_i(P_{ij}) \qquad (4)$$

For the linearized case of Equation (3), the total manifold liquid flow is specified by substitution into Equation (4):

$$M_j = \sum_{i=1}^{N} [A_i + B_i * P_{ij}] \quad (5)$$

Equation (5) will be used to demonstrate the basis of the calibration procedure for the linearized liquid flow parameter of Equation (3). This calibration procedure enables the computation of the calibration coefficients $A_i$ and $B_i$ for each nozzle. The In the preferred embodiment, those conditions are generated by temporarily and singly interrupting liquid flow to each of the liquid-commissioned nozzles. Each time a nozzle is temporarily decommissioned with liquid, the liquid flow parameter must be measured for each nozzle. In addition, the total liquid flow to the manifold must be measured. For example, when nozzle 1 is temporarily decommissioned, liquid flow parameter $P_{21}$ is the liquid flow parameter measured for nozzle 2; $P_{11}$ is the liquid flow parameter for nozzle 1 with zero liquid flow to nozzle 1. The entire system of equations is expressed in matrix form as shown in Table 1.

TABLE 1
SYSTEM OF EQUATIONS
FOR ALL MANIFOLDED NOZZLES $$\begin{vmatrix} M_1 \\ M_2 \\ \cdot \\ \cdot \\ M_N \\ \hline 0 \\ \cdot \\ \cdot \\ 0 \end{vmatrix} = \begin{vmatrix} 0 & P_{21} & \ldots & P_{N1} \\ P_{12} & 0 & \ldots & P_{N2} \\ & & & \\ & & & \\ P_{1N} & P_{2N} & \ldots & 0 \\ \hline P_{11} & 0 & \ldots & 0 & 0 \\ 0 & P_{22} & 00 & 0 \\ 0 & 0 & \cdot & 0 & 0 \\ & & \cdot & & \\ 0 & 0 & \ldots & 0P_{NN} \end{vmatrix} \begin{vmatrix} 0 & 1 & \ldots & 1 \\ 1 & 0 & 1 & \ldots & 1 \\ & & & \\ & & & \\ 1 & 1 & \ldots & 0 \\ \hline 1 & 0 & \ldots & 0 \\ 0 & 1 & 0 & \ldots & 0 \\ & \cdot & & \\ & \cdot & & \\ 0 & 0 & \ldots & 1 \end{vmatrix} * \begin{vmatrix} B_1 \\ B_2 \\ \cdot \\ \cdot \\ B_N \\ \hline A_1 \\ \cdot \\ \cdot \\ A_N \end{vmatrix}$$

Equations generated by rows j and j+N respectively specify the total manifold liquid flow and the $j^{th}$ nozzle liquid flow for the case where the $j^{th}$ nozzle has no oil flow. The left most vector is called the flow vector, the matrix is the calibration data matrix, and the right most vector contains the unknown slopes and intercepts (e.g., the calibration coefficients).

Turning oil off to one or more nozzles may cause an oil flow change at the other nozzles. For example, if the total manifold flow is kept constant, decommissioning one or more nozzles will generally increase the flow to each remaining nozzle. Rows 1 to N specify the total manifold liquid flow rate with each nozzle sequentially and temporarily decommissioned with liquid flow.

For no oil flow to the $i^{th}$ nozzle (where i=j), Equation 5 is equivalently written as:

$$M_j = \sum_{i=1}^{N} (A_i + B_i * P_{ij}) \quad i \neq j \quad (6)$$

(note for $i = j$, argument $= 0$)

Rows N+1 to 2N specify the zero liquid flow condition through the ith nozzle (i=j) while it is temporarily decommissioned with liquid.
Equation for the nozzle with no oil flow (i=j):

$$F_{ij}0 = B_i*P_{ij}+A_i = B_iP_{ii}+A_i \quad (7)$$

The above variables are summarized as follows:
  $M_j$ = total oil manifold flow for manifold condition j (as shown above that condition is for no oil flow to the $j^{th}$ nozzle)
  $F_{ij}$ = liquid flow to $i^{th}$ nozzle (=0 if nozzle is decommissioned with liquid)
  $P_{ij}$ = liquid flow parameter for $i^{th}$ nozzle where the first subscript i=the nozzle number; and j=the manifold condition. For the matrix shown in Table 1, the second subscript j refers to the nozzle number temporarily decommissioned with liquid flow.
  $A_i$ = constant calibration coefficient to be determined for nozzle i
  $B_i$ = slope calibration coefficient to be determined for nozzle i For a feed system with N liquid-commissioned nozzles and a corresponding N ROs, a system of 2N equations can be written relating the liquid flow parameters to liquid flow rate. (Note: N may be less than or equal to the total number of physical nozzles installed on the manifold. Normally or permanently liquid decommissioned nozzles may be ignored while performing the matrix calibration experiments.) In this demonstration case, the liquid flow parameter is approximately linear and the corresponding equations are linear; each equation being uniquely specified by a slope and intercept. For N liquid commissioned nozzles, this representation results in N unique slopes and N unique intercepts. The calibration procedure described in this invention teaches a method for determining the necessary liquid flow calibration coefficients (slopes and intercepts for the linear case).

The examples used for illustration are selected with liquid flow parameters that are linearly related to liquid flow rate. For the important case of manifolded FCCU feed nozzles, approximately linear parameters are readily available. In the linear case, the N slopes and N intercepts can be considered as 2N unknowns. A system of 2N linear equations can be written as shown in Table 1. To formulate these equations, it is necessary to conduct measurements on the liquid feed system in a multitude of operating states. A particularly effective scheme of formulating these equations is as follows:

(1) Measure the liquid flow parameters for each liquid-commissioned nozzle and the total liquid flow to the manifolded feed system for liquid flowing to all liquid-commissioned nozzles with the liquid flow to one commissioned nozzle temporarily interrupted. The liquid flow parameter must also be measured for the nozzle which has been temporarily decommissioned. This measurement is best made at a time when all liquid and gas flows to the feed system have reached steady state flow conditions.

(2) Recommission (put the nozzle back in service with liquid flow) nozzle whose liquid flow was temporarily interrupted and then temporarily decommission a different nozzle.

(3) Repeat the measurements of step 1 above when conditions have reached steady state.

(4) Continue the above procedure until N sets of measurements have been made while each liquid-commissioned nozzle has been singly and temporarily decommissioned.

(5) For non-linear representations, additional independent measurements must be made. For each additional non-zero term in Equation 2, an additional N independent measurements are required.

The above procedure, denoted as the calibration measurement scheme, provides the necessary numerical data for the Table 1 equations. This measurement scheme provides the data for the flow vector. The first N values of the flow vector are the total manifold liquid flows; the second set of flows in the flow vector are the liquid flows to the nozzle that was temporarily decommissioned (e.g., zero flow). The data for the first N rows of the calibration matrix are the liquid flow parameters from the liquid commissioned nozzles with non-zero liquid flows; data for the second N rows of the liquid calibration matrix are the liquid flow parameters from each temporarily decommissioned nozzle. The N unknown slopes and N unknown intercepts can be readily calculated using well-known computational procedures (for example, matrix inversion). The solution for the N unknown slopes and N unknown intercepts is referred to as the liquid flow calibration coefficients. The solution for these coefficients constitutes a unique calibration for each sensor.

After the calibration coefficients have been determined, it is possible to check the overall absolute computation accuracy. With all of the liquid-commissioned nozzles recommissioned with liquid flow, the liquid flow parameter can be measured for each nozzle. The liquid mass (or volume) flow rate can then be computed for each nozzle. The sum of the liquid flows through each nozzle should be comparable to the liquid flow rate being supplied to the manifold.

The above calibration measurement scheme is clearly not unique. However, available data indicate the outlined scheme minimizes experimental data collection requirements and provides computational advantages with respect to roundoff error and speed. The use of redundant data for crosschecking the calibration flow coefficients or minimizing effects of measurement uncertainty is useful. The redundant data may include multiple alternative manifold flow conditions or repeats of the same flow conditions.

In some cases, the liquid flow parameter may not be sufficiently linear to represent flows by a linearized slope and intercept. In such cases, there may be higher order terms such as polynomial expressions. To solve for the additional liquid flow calibration coefficients, supplementary flow conditions will need to be tested during the calibration measurement scheme.

For the situation where non-linear terms are included in the correlation between the liquid flow parameter and the liquid mass flow rate, the aforementioned scheme for formulating the equations must be supplemented. Each additional non-linear term will have a corresponding unknown calibration coefficient that must be determined. For a manifold with N liquid commissioned nozzles, each non-linear term will provide an additional N such coefficients (one supplemental coefficient for each nozzle). It is therefore necessary to generate an additional N equations to specify the additional N unknown coefficients. These additional N equations can be specified by sequentially restricting the liquid flow to each nozzle in addition to fully decommissioning the liquid flow.

This scheme of partially restricting liquid flow also provides a method of obtaining the necessary number of equations when block valves (17 in FIG. 1d) are not fully operative. For example, if a block valve cannot be fully closed or is totally inoperative, additional equations can be obtained by closing the defective valve as much as possible or partially restricting the liquid flow to another nozzle.

It is generally not expected that the slopes and intercepts defining the calibration for each nozzle will be equal. The differences are indicative of subtle geometric differences. Some of these changes may evolve during prolonged operation of a process manifold because of fouling, plugging, or erosion of either the ROs or nozzle throat orifices.

It is a practice in some liquid feed systems to add back pressure to the oil supply manifold by slightly throttling the liquid flow control valve at each nozzle. This practice causes no particular difficulties for the calibration measurement scheme. The calibration measurement scheme described above does not mandate that any specific nonzero flow rates be achieved. The only requirement for the preferred embodiment is that liquid flow to each nozzle can be temporarily and fully decommissioned. In fact, after the flow parameters have been determined, said liquid flow control valves may be used to redistribute the flow in accord with the desired distribution pattern.

In manifolded systems where nozzles are inoperative or normally decommissioned, the effective number of equations can be accordingly reduced. The above calibration measurement scheme can be implemented for less than the physical number of nozzles by simply omitting the normally or permanently decommissioned nozzle(s).

Figure 2A:
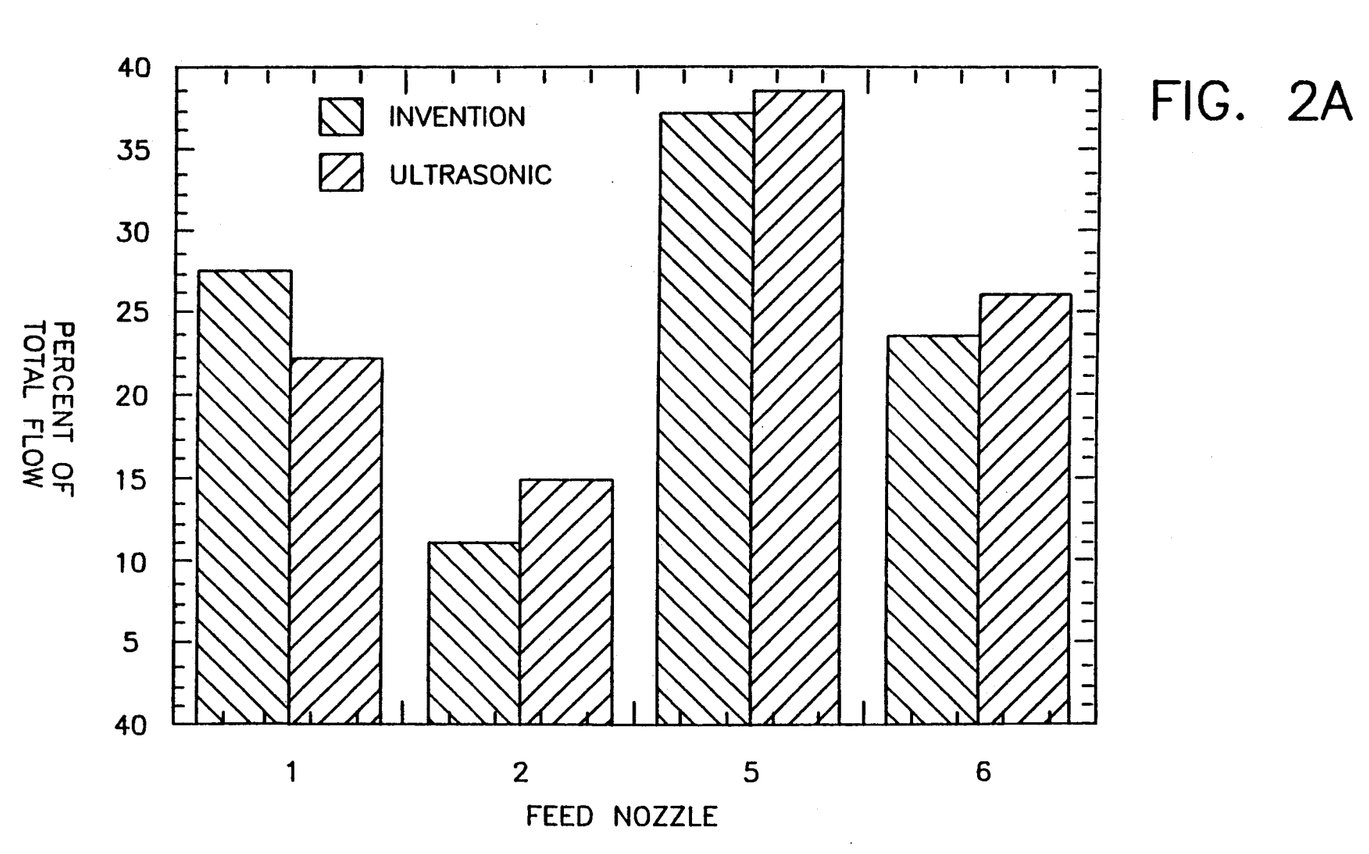
FIG. 2a shows the comparison of the invention results with an independent liquid flow measurement. Liquid flows are shown as a percent of total manifold liquid flow.

FIG. 2a compares the flow measuring technique of this invention with an independent flow measuring device. It shows the percent of total manifold flow for each liquid commissioned nozzle on the manifold. The specific example is from a FCC unit manifolded feed system. The feed temperature for this installation was unusually low making it possible to use an external ultrasonic flow meter. For this particular example, the linear flow parameter was static pressure measured downstream of the steam RO (location 30 in FIG. 1d). The agreement demonstrated in FIG. 2a is consistent with the specified error associated with the ultrasonic flow meter. In this case, the RO upstream pressure was fixed at 150 psi.

Figure 2B:
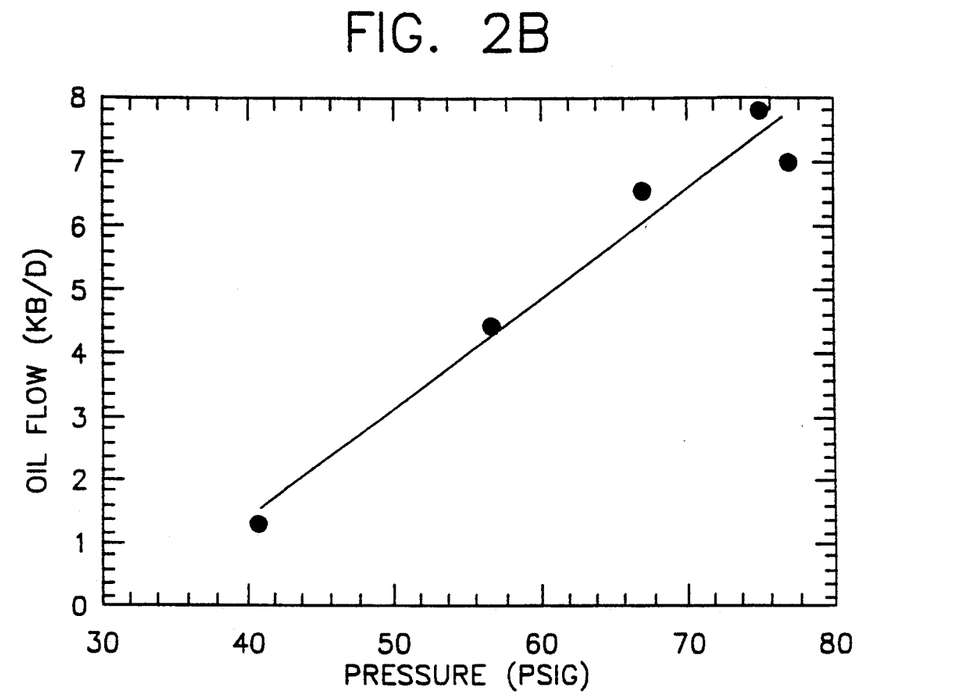
FIGS. 2b and 2c show the linear dependence between per nozzle liquid flow and static pressure.
Figure 2C:
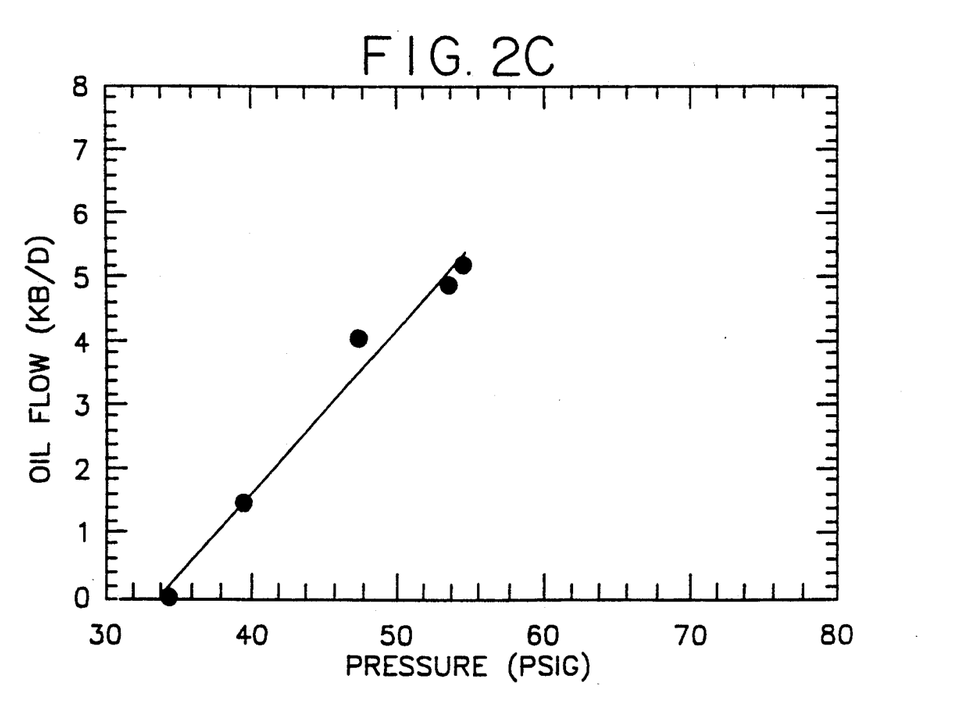

FIGS. 2b and 2c demonstrate the linearity of static pressure as the liquid flow parameter for two separate nozzles. The nozzles used in FIGS. 2b and 2c are the same ones used in FIG. 2a. FIGS. 2b and 2c show the results of two individual nozzles turned on in discrete steps comparing the static pressure with the measured liquid flow rate. It is emphasized that it was not necessary to explicitly measure the liquid flow rate to practice this invention. The linearity between flow and static pressure was unexpected in light of the nonlinearities generally associated with two phase nozzle orifice flows. The flows are specified in KBl/d (=1000 Barrel/day where 1 barrel equals 42 U.S. gallons). The pressure is in pounds per square inch.

Figure 3A:
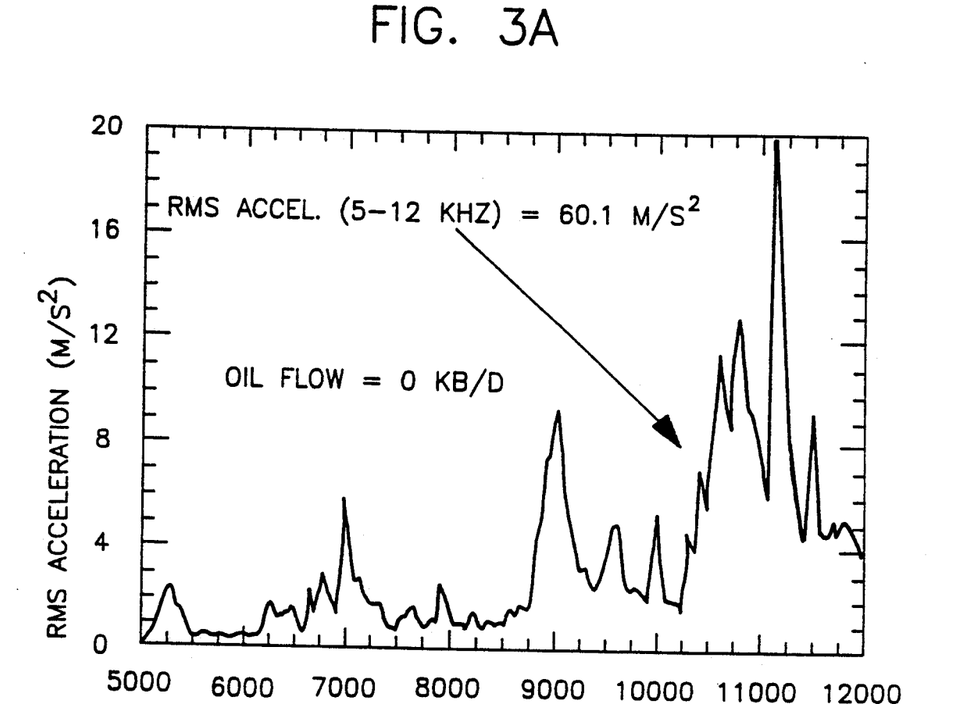
Figure 3B:
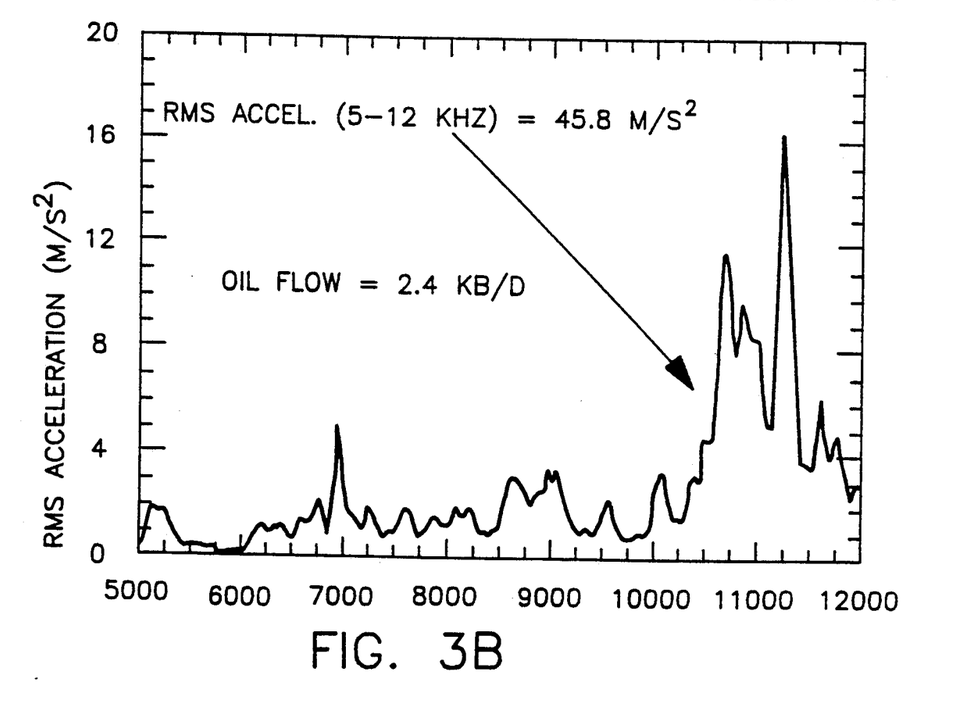
Figure 3C:
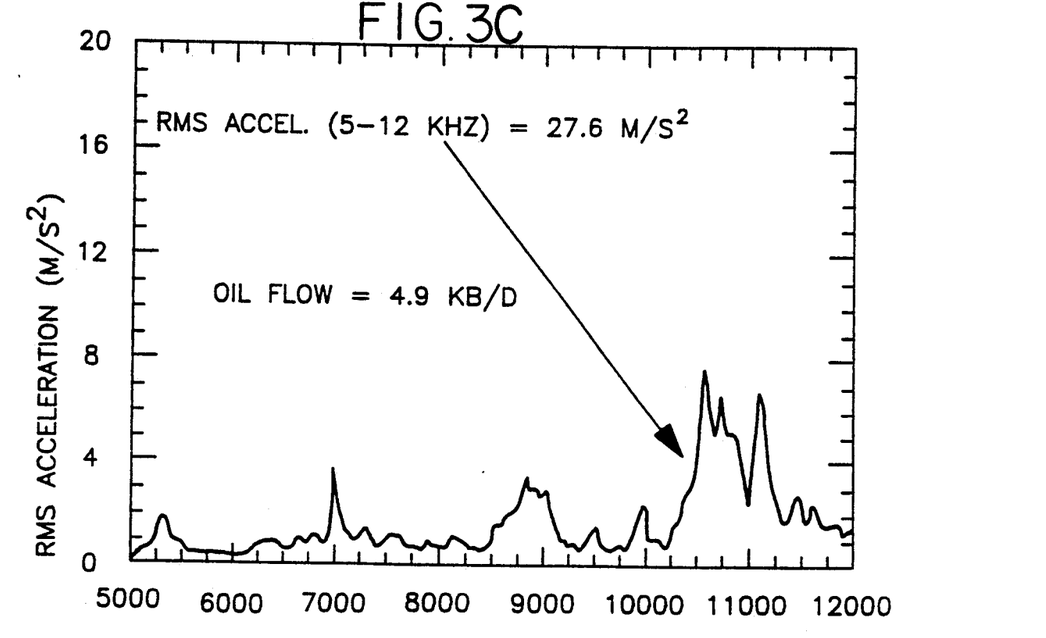
Figure 3D:
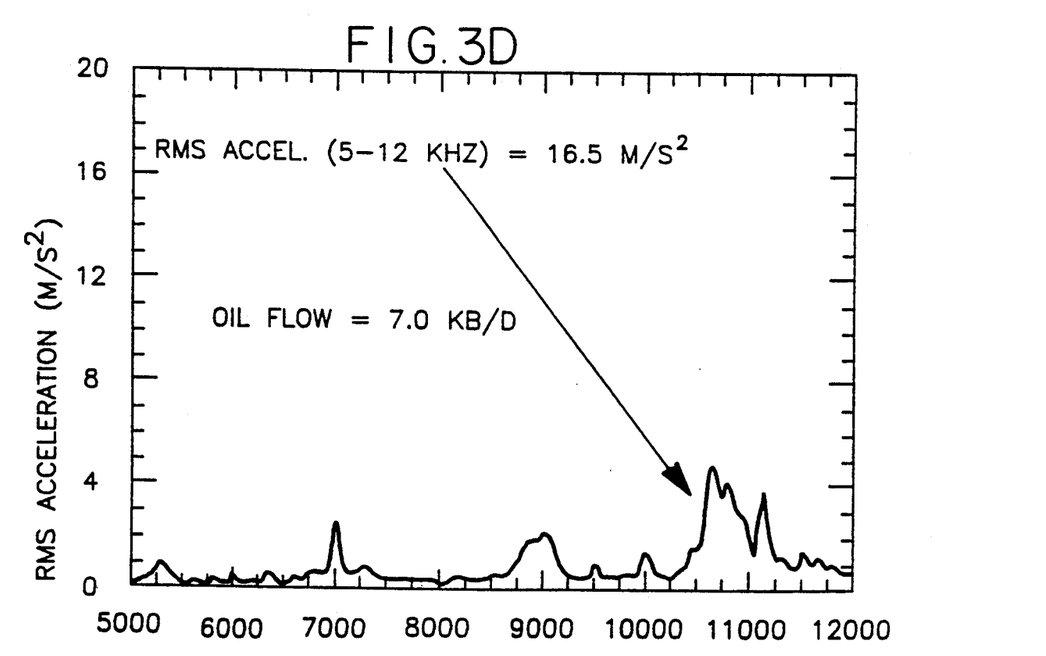
Figure 3E:
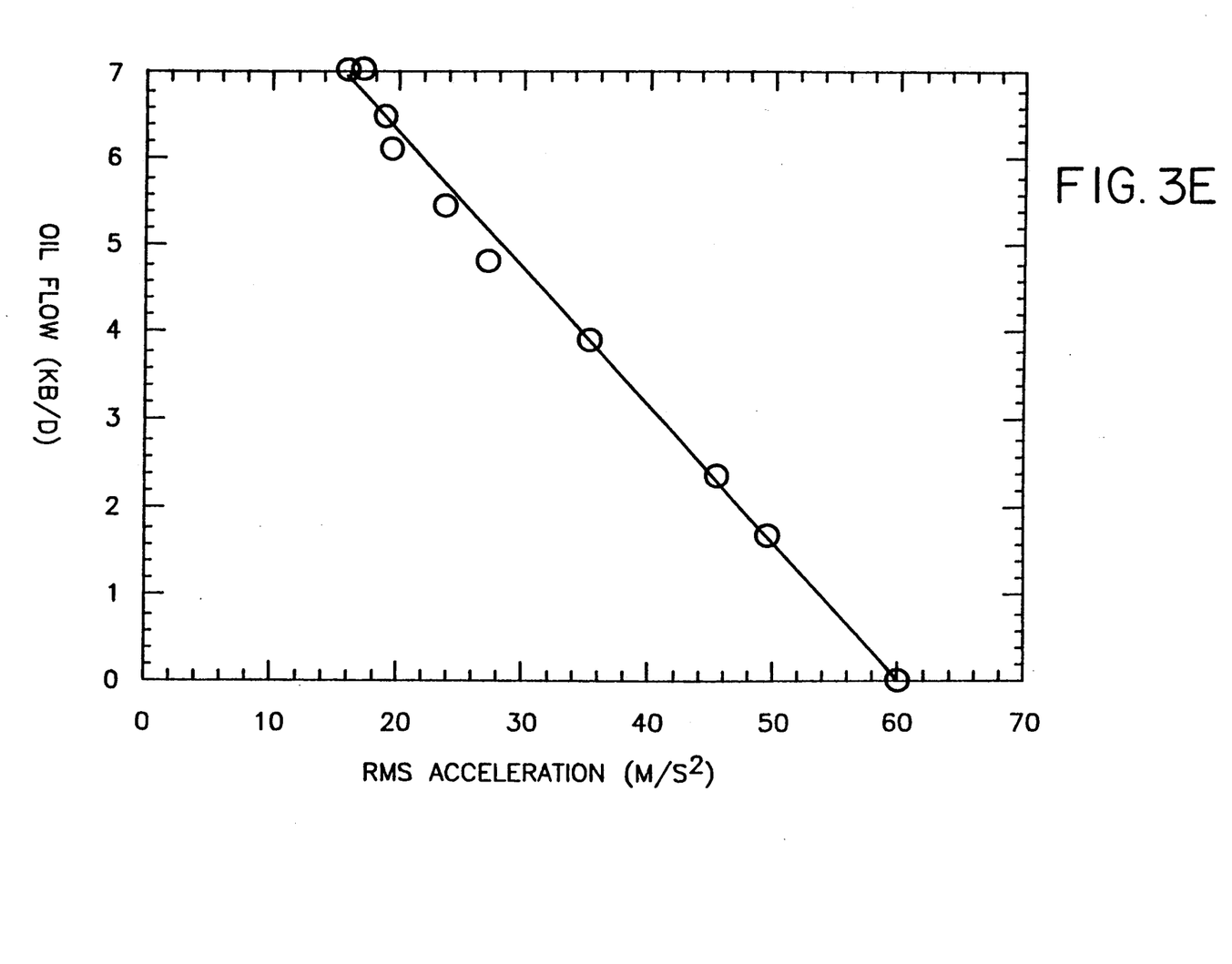
FIG. 3e show the linear dependence between liquid flow and RO acceleration gas peaks.

In addition to static pressure, other parameters are available which respond linearly with respect to liquid flow. FIGS. 3a, 2b, 3c and 3d show a series of rms vibration spectra operating on a working fluidized catalytic cracking unit injecting oil and steam into the feed injection zone (FIG. 1a). Each graph in FIGS. 3a, 3b, 3c and 3d correspond to a specific liquid flow rate. FIG. 3e demonstrates that the rms acceleration integrated over the frequency range (5000–12000 Hz) indicated in FIG. 3a, 3b, 3c and 3d correlates in a linear fashion with respect to liquid oil flow. To within a multiplicative factor, the actual integration computes the band-limited root-mean-square (rms) acceleration by first squaring the data in FIGS. 3a, 3b 3c and 3d integrating, and then, calculating the square root of the result. The rms acceleration was measured with an accelerometer vibrational sensor (24) in FIG. 1d. Since the rms acceleration in this band is generated by the gas flow and pressure drop across the RO (19 in FIG. 1d), it is referred to as the gas peak range. It is a property that the RO acceleration gas peak range is inversely proportional to the liquid flow rate.

FIGS. 4a, 4b, 4c, 4d and 4e show a similar series of power spectra and linear dependence between the acceleration liquid flow peaks from a working FCCU feed nozzle and the liquid oil flow. As shown in FIG. 4a, 4b, 4c and 4d the liquid flow peaks are in the 1000-2000 Hz range. The liquid flow peaks are generated by flowing and mixing liquid downstream of (20) in FIG. 1d. The rms acceleration was measured with an accelerometer vibrational sensor (26) in FIG. 1d. The results in FIG. 4e demonstrate that the functional relationship between the rms acceleration in the 1000-2000 Hz band is linearly related to liquid flow rate. It is a property that the liquid flow peak are proportional to liquid flow rate. Therefore, both the gas peaks or the liquid flow peaks can be used as liquid flow parameters.

Figure 4A:
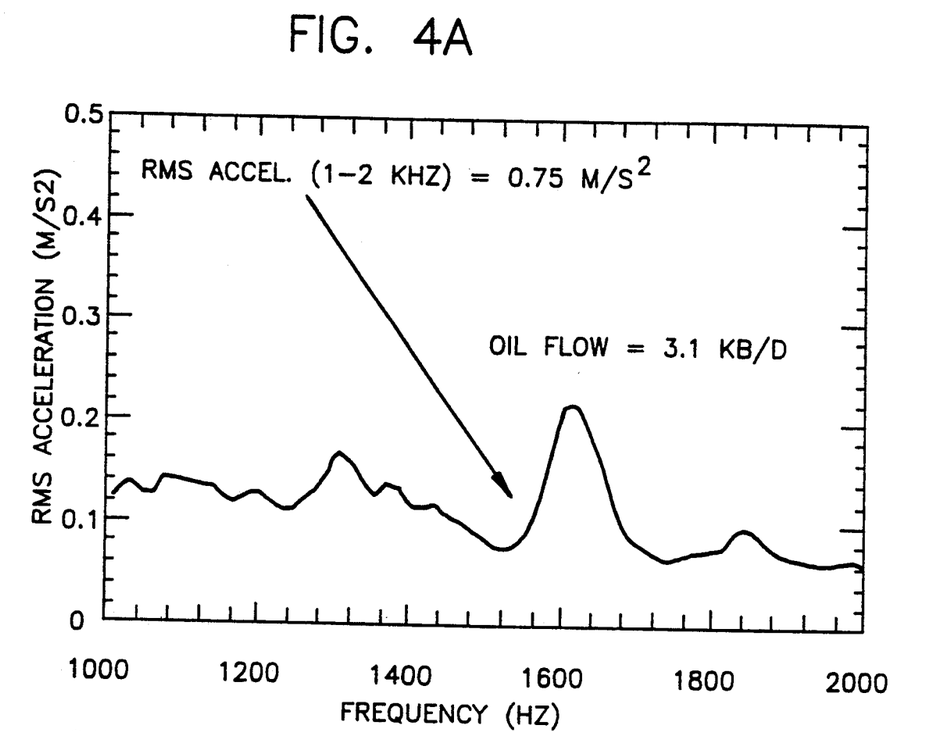
FIGS. 4a, 4b, 4c and 4d show a suite of rms acceleration spectra illustrating the linearly dependent liquid flow acceleration peaks with respect liquid flow.
Figure 4B:
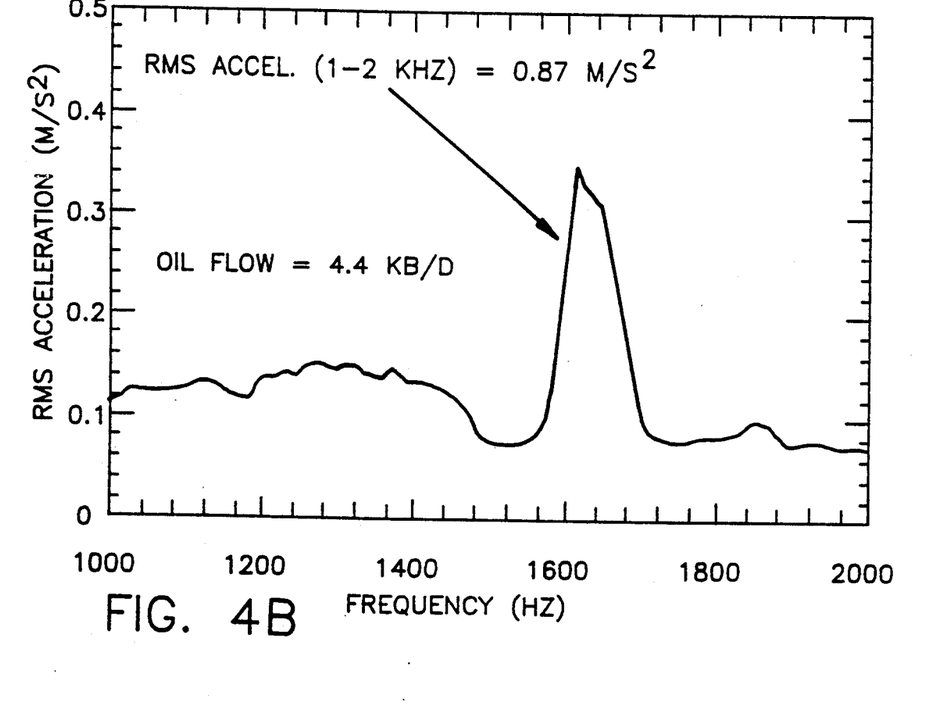
Figure 4C:
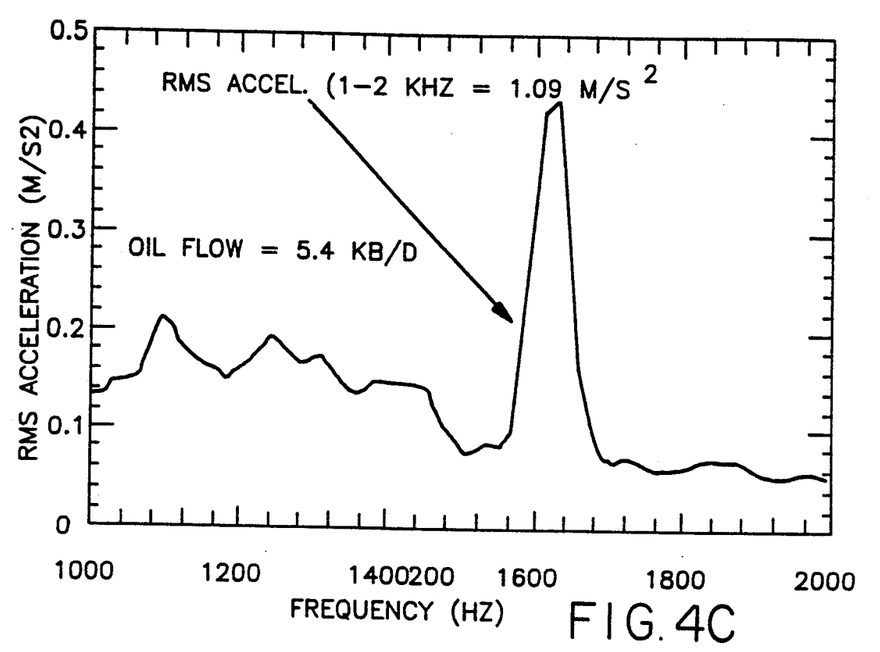
Figure 4D:
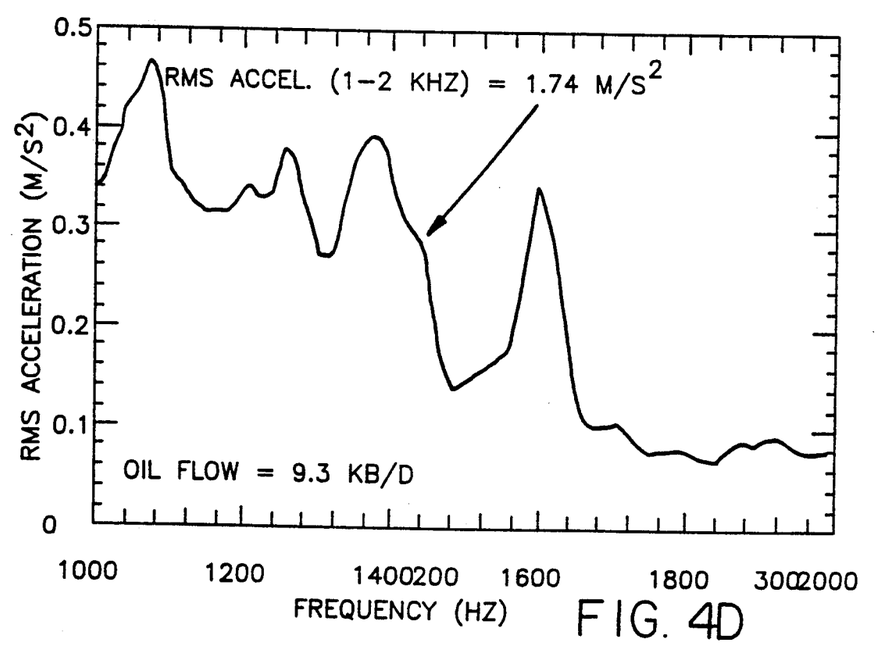
Figure 4E:
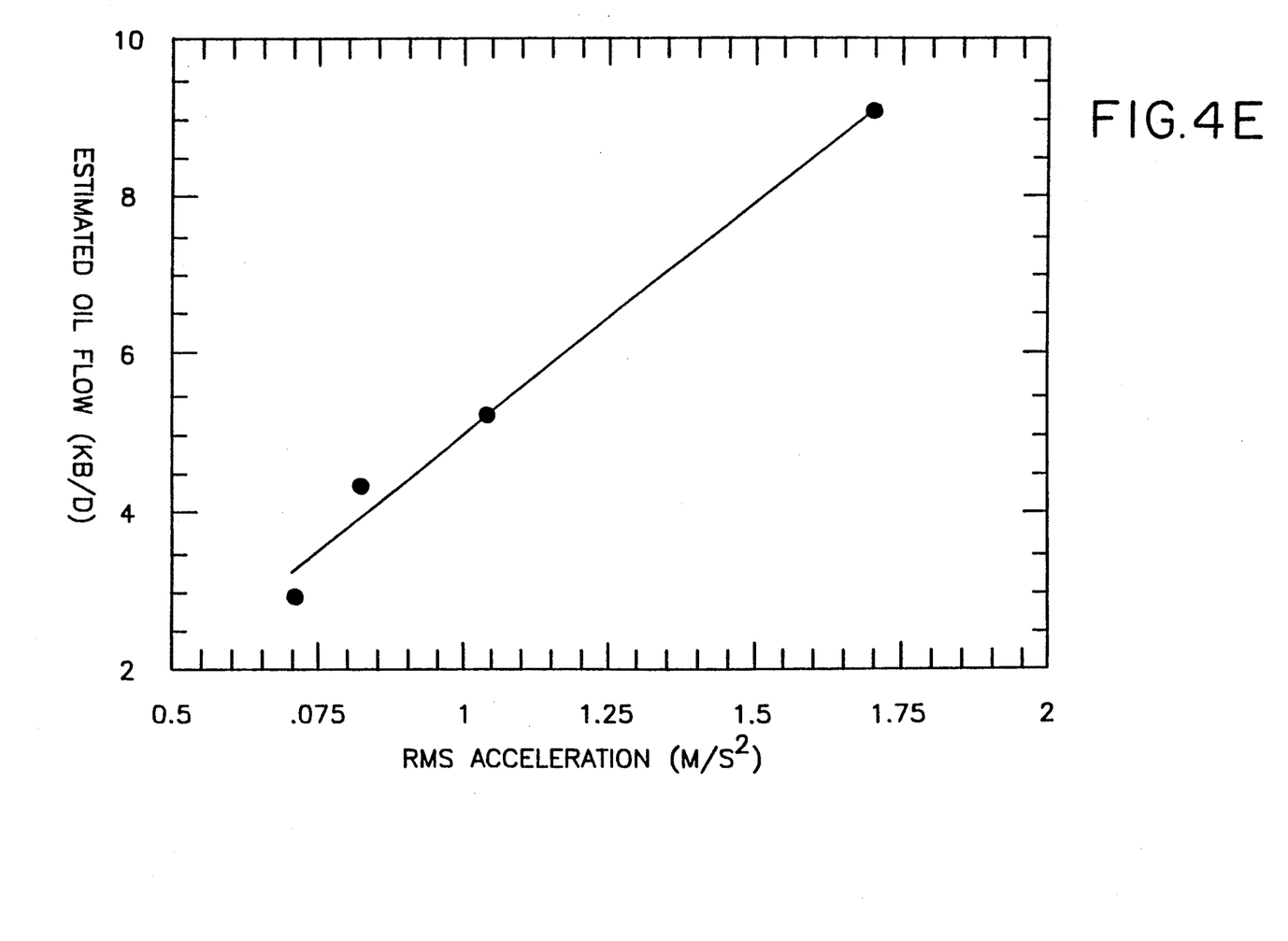
FIG. 4e shows the linear dependence between liquid flow and liquid flow peaks.
Figure 5A:
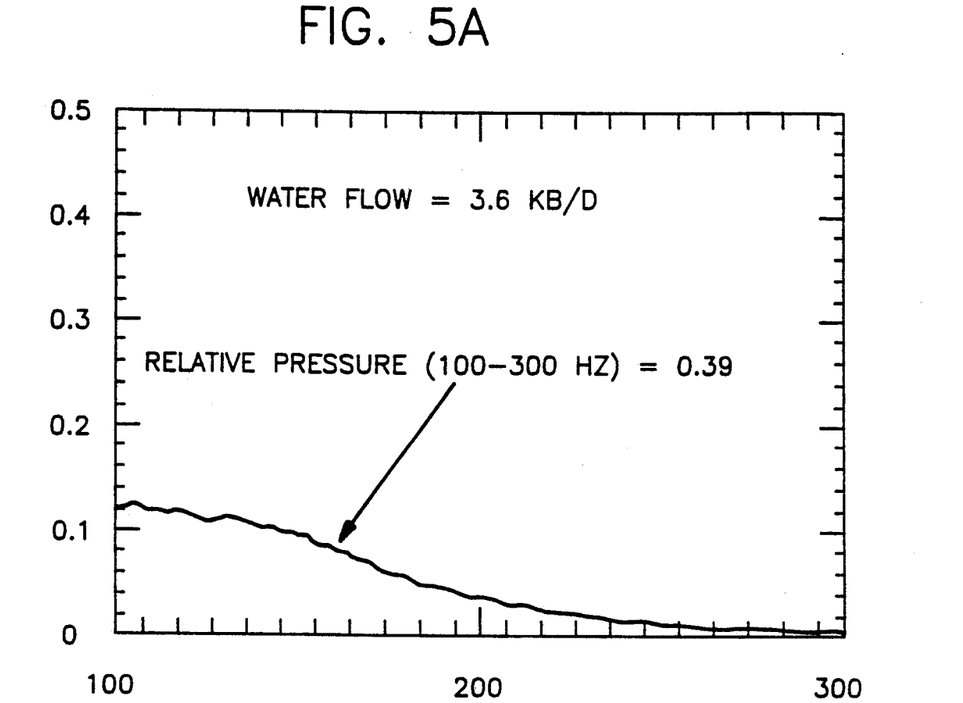
FIG. 5a, 5b, 5c and 5d show linear dependence between liquid flow and relative rms dynamic pressure.
Figure 5B:
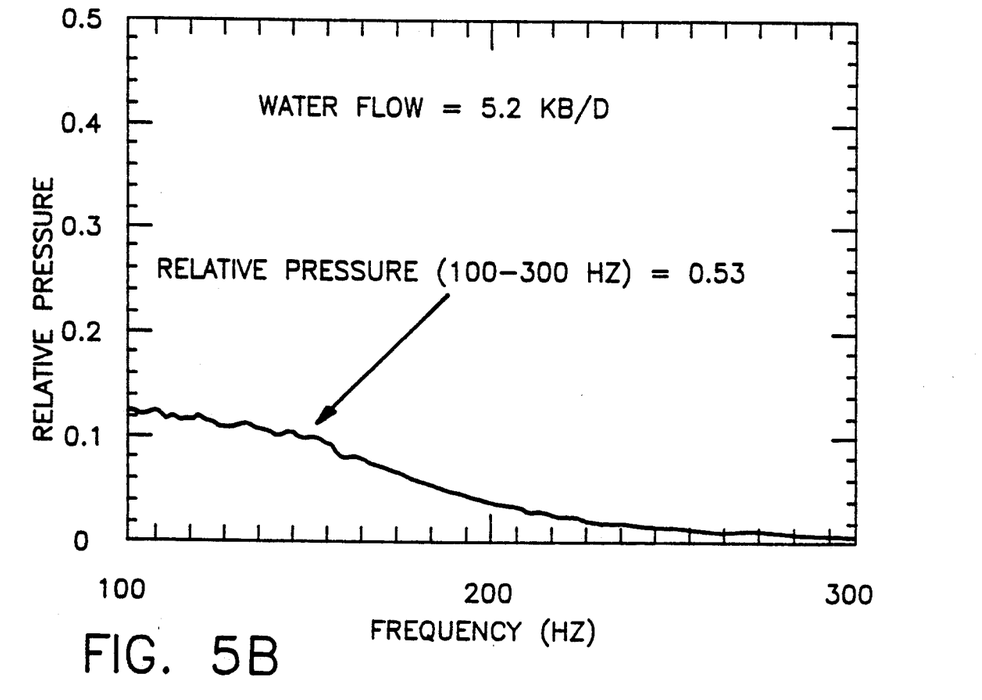
Figure 5C:
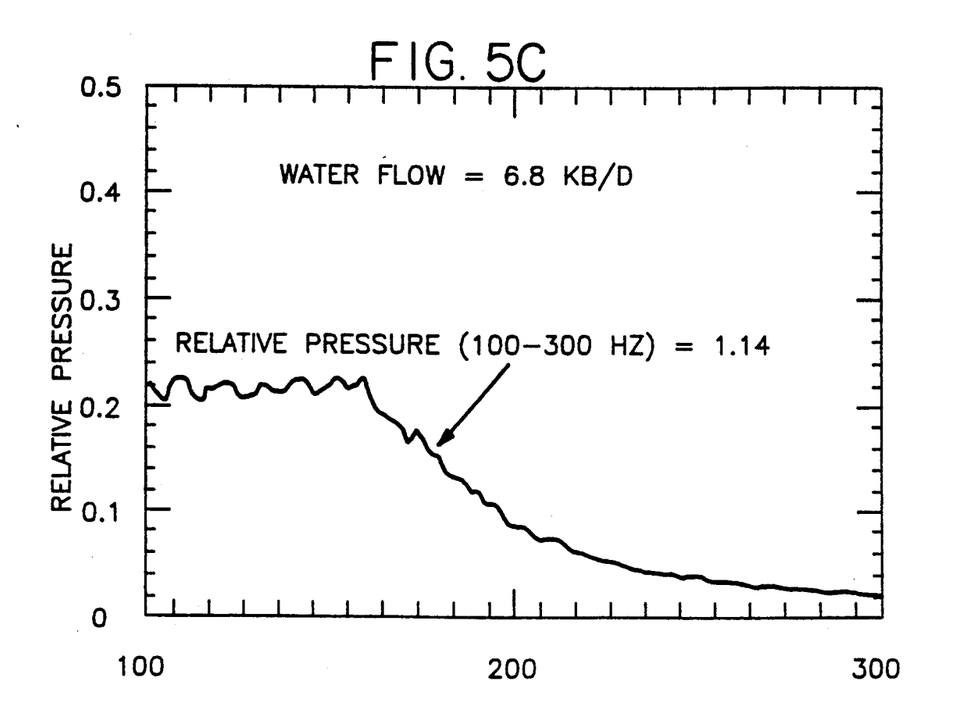
Figure 5D:
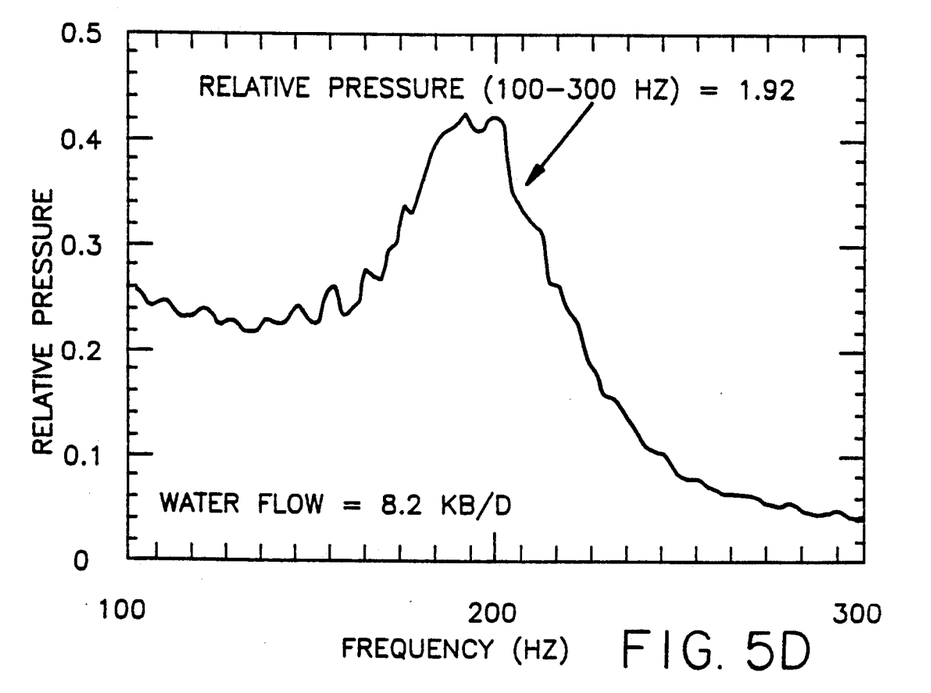
Figure 5E:
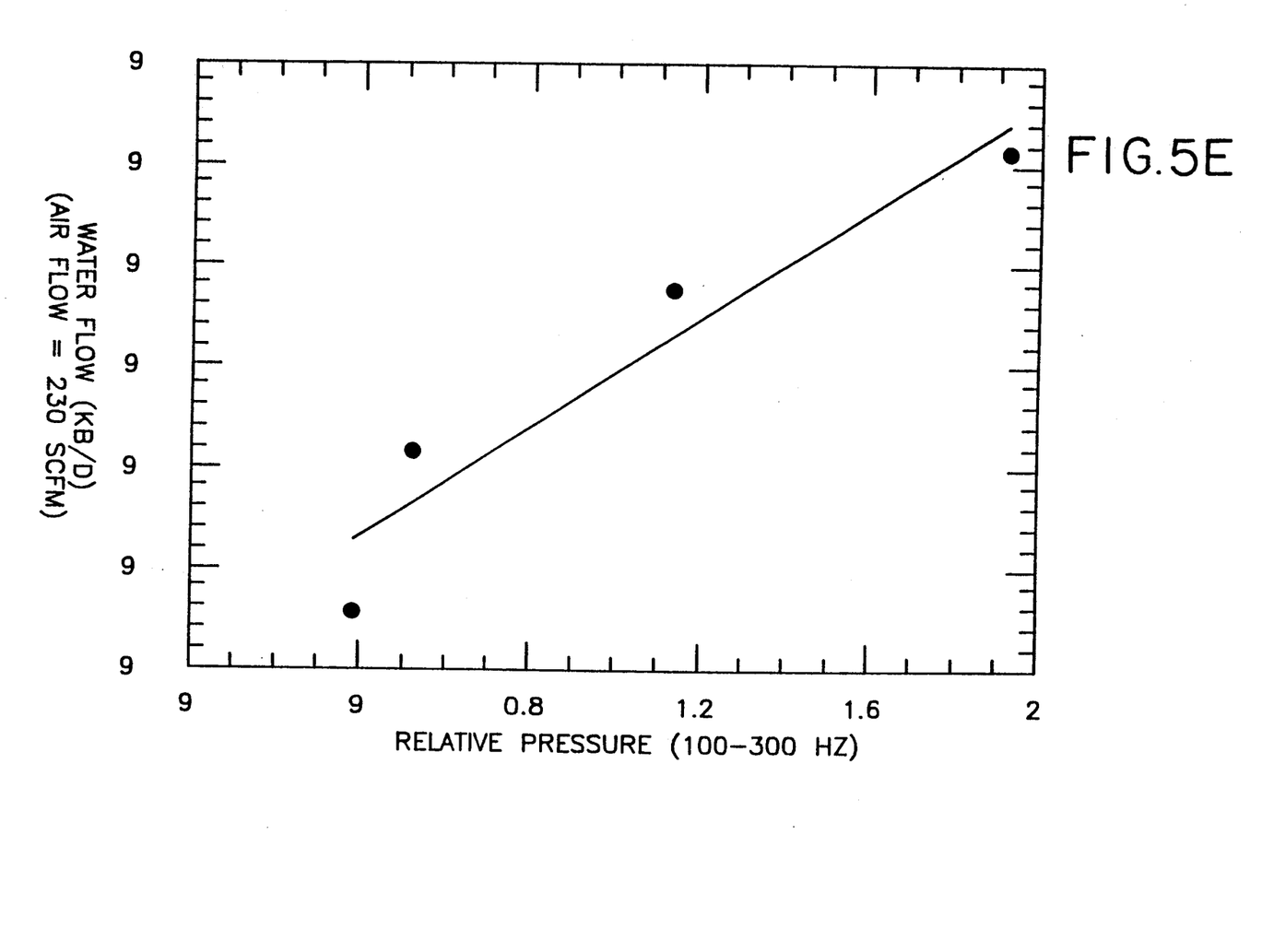
FIG. 5e shows a suite of rms pressure spectra illustrating the linearly dependent dynamic pressure signal with respect to liquid flow (for air flow rate of 230 scfm).

Dynamic pressure can also be used as a liquid flow parameter. The following measurements were conducted in a test facility where the gas was air and the liquid was water. FIGS. 4a, 5b, and 5d and 5d illustrate liquid flow rate as a function of the integrated dynamic rms pressure in the frequency range of 100-300 Hz for a fixed air flow rate of 230 scfm. Those data show that dynamic pressure is essentially linearly correlated with liquid mass (or volume) flow rate. FIG. 5e presents this concept explicitly showing some of the corresponding rms pressure spectra used to define the correlation in FIGS. 5a through 5d. The data in FIGS. 5a through 5e therefore demonstrate that dynamic pressure is a suitable liquid flow parameter for use with this invention.

What is claimed is:

1. A method for determining in-service the absolute volume flow rate of liquid from each liquid commissioned nozzle in a plurality of manifolded nozzles which carry two-phase liquid/gas flow comprising:
    (a) temporarily interrupting the liquid flow through one of said liquid commissioned nozzles;
    (b) measuring the total volume of the liquid flow to the manifold system;
    (c) measuring a liquid flow parameter for each of said liquid commissioned nozzles (including the one temporarily decommissioned) where the parameter is functionally related to the volume of nozzle liquid flow; finally liquid flow is restored to the nozzle where flow was temporarily interrupted;
    (d) repeating steps (a), (b) and (c) for each of said liquid commissioned nozzle in said manifold;
    (e) determining a linear functional relationship including calibration coefficients between the liquid flow and the liquid flow parameter for each liquid commissioned nozzle;
    (f) determining the present value of said liquid flow parameter for at least one nozzle;
    (g) determining the liquid flow volume from the functional relationship of claim 1(e).

2. The method of claim 1 further comprising the steps of:
    adjusting said nozzle(s) to alter said liquid flow.

3. The method of claim 2 wherein said steps are performed interactively for each of said nozzle in said manifold.

4. The method of claim 2 wherein said liquid flow parameter in static pressure.

5. The method of claim 2 wherein said liquid flow parameter is dynamic pressure.

6. The method of claim 2 wherein said liquid flow parameter is a liquid flow peak measured with an accelerometer.

7. The method of claim 2 wherein said liquid flow parameter is a gas peak measured with an accelerometer.

8. The method of claim 2 where frequency domain processing of the signals may be required in order to produce the required liquid flow parameter.

9. The method of claim 1 further comprising the step of determining the mass flow rate from said volume flow rate.

10. A method for determining in-service the flow rate of liquid from each liquid commissioned nozzle in a plurality of manifolded nozzles which carry two-phase liquid/gas flow wherein said volume of liquid flow is functionally related to a liquid flow parameter comprising:
    (a) restricting or interrupting the flow of liquid to each commissioned nozzle sequentially;
    (b) repeating step (a) for each unknown calibration coefficient in said functional relationship wherein the restricted volume of nozzle liquid flow may be different in each repeat of step (a);
    (c) measuring the liquid flow parameter for each of said liquid commissioned nozzles after each restriction (including the one temporarily restricted or interrupted);
    (d) measuring the total volume of liquid flow to the manifold after each restriction;
    (e) determining the functional relationship including calibrating coefficients between the liquid flow and the liquid flow parameter,
    (f) determining the present value of said liquid flow parameter for at least one nozzle;
    (g) determining the liquid flow volume from the functional relationship of claim 8(e).

11. The method of claim 10 further comprising the steps of:
    adjusting said nozzle to alter said liquid flow.

12. The method of claim 11 wherein said liquid flow parameter is static pressure.

13. The method of claim 11 wherein said liquid flow parameter is dynamic pressure.

14. The method of claim 11 wherein said liquid flow parameter is a liquid flow peak.

15. The method of claim 11 wherein said liquid flow parameter in a gas peak.

16. The method of claim 10 further comprising the step of determining the mass flow rate from said volume flow rate.

* * * * *